(12) United States Patent
Schmidt et al.

(10) Patent No.: US 11,852,204 B2
(45) Date of Patent: Dec. 26, 2023

(54) OUTER PART FOR HOMOKINETIC JOINTS AND ROLLING BEARINGS

(71) Applicant: IFA-Technologies GmbH, Haldensleben (DE)

(72) Inventors: Martin Schmidt, Haldensleben (DE); Heike Kleinhaus, Solpke (DE); Sebastian Eilert, Haldensleben (DE)

(73) Assignee: IFA-Technologies Gmbh, Haldensleben (DE)

(*) Notice: Subject to any disclaimer, the term of this patent is extended or adjusted under 35 U.S.C. 154(b) by 408 days.

(21) Appl. No.: 17/279,098

(22) PCT Filed: Sep. 25, 2019

(86) PCT No.: PCT/DE2019/100846
§ 371 (c)(1),
(2) Date: Mar. 24, 2021

(87) PCT Pub. No.: WO2020/064057
PCT Pub. Date: Apr. 2, 2020

(65) Prior Publication Data
US 2021/0388872 A1      Dec. 16, 2021

(30) Foreign Application Priority Data
Sep. 28, 2018 (DE) .......................... 102018124078.3

(51) Int. Cl.
*F16D 3/223* (2011.01)
*F16D 3/84* (2006.01)

(52) U.S. Cl.
CPC ............ *F16D 3/223* (2013.01); *F16D 3/843* (2013.01); *F16D 2003/22326* (2013.01); *F16D 2300/12* (2013.01); *Y10S 464/906* (2013.01)

(58) Field of Classification Search
CPC .................... F16D 3/223; F16D 3/843; F16D 2003/22326; F16D 2300/12; Y10S 464/906
(Continued)

(56) References Cited

U.S. PATENT DOCUMENTS 332,667 A * 12/1885 Lyons ..................... F16L 23/14
2,356,572 A * 8/1944 Dornig ..................... F16D 3/68
464/182
(Continued)

FOREIGN PATENT DOCUMENTS

DE   102009018373 A1   1/2011
DE   102016007495 A1   12/2017
(Continued)

*Primary Examiner* — Greg Binda
(74) *Attorney, Agent, or Firm* — Michael Soderman

(57) ABSTRACT

An outer part for homokinetic joints and rolling bearings, the outer part having, at least at one of its end faces, an annular sealing face. Axially running bores for receiving fastening means are formed in the end faces of the outer part, the sealing face extending in the region of the bores radially between the bores and the inner diameter of the outer part. A contour protruding from the sealing face is arranged on the end-face sealing face(s) of the outer part, against which contour the seal presses when fitted. Said contour, which protrudes nose-like in longitudinal cross-section, provides even at the pre-assembled stage a small seating surface for the seal, such that the contour is fixed in position, without the use of an adhesive, even under small pressing forces, such as those usually applied during the preassembly of the module to which the outer part belongs.

8 Claims, 2 Drawing Sheets

(58) Field of Classification Search
USPC .......................................................... 464/182
See application file for complete search history.

(56) References Cited

U.S. PATENT DOCUMENTS

| 8,449,399 | B2* | 5/2013 | Kozlowski | .............. | F16D 1/076 |
| | | | | | 464/906 |
| 10,197,104 | B2* | 2/2019 | Nicholas | ................... | F16D 3/84 |
| 2003/0042690 | A1 | 3/2003 | Oki | | |

FOREIGN PATENT DOCUMENTS

| FR | 805186 | * | 11/1936 | .................... 464/143 |
| FR | 2623579 | A1 | 5/1989 | |
| GB | 2072305 | A | 9/1981 | |
| GB | 2347730 | A | 9/2000 | |
| WO | 03020460 | A2 | 3/2003 | |

* cited by examiner

OUTER PART FOR HOMOKINETIC JOINTS AND ROLLING BEARINGS

CROSS REFERENCE TO RELATED APPLICATIONS

This application is the U.S. national stage of International Application No. PCT/DE2019/100846, filed on 2019 Sep. 25. The international application claims the priority of DE 102018124078.3 filed on 2018 Sep. 28; all applications are incorporated by reference herein in their entirety.

BACKGROUND

The invention is developed on the basis of an external part for homokinetic joints and rolling bearings in accordance with an "external part for homokinetic joints and rolling bearings, wherein the external part (1) has an annular sealing surface (12) on at least one of its end faces, and axially extending drillholes (15) are created on the end face in the external part (1) to accommodate fastening means, wherein the sealing surface (12) extends radially between the drillholes (15) and the inner diameter of the external part (1) in the region of the drillholes (15)".

Joints and bearings are typically sealed on the end face by means of flat gaskets, which are pressed against the end face of the external part by a cover element which seals off the joint or bearing. For this purpose, drillholes are created in the ring-shaped end face of the external part, in which the fastening means such as screws, pins, rivets can be inserted or through which the screws, pins or rivets can pass through the external part. Since the sealing surfaces are "planar faces" and the drillholes in the gasket have a radial play with respect to the fastening means, there is a risk that the gasket will shift during transport of a component which has only been pre-assembled, and whose elements have not yet been attached to each other with the pressing force prescribed for operation, or during downstream work steps thereon or final assembly of the component itself. In order to prevent the gasket from shifting or lifting away from the sealing surface, which is already relatively narrow in the radial direction, it is known to initially stick the gaskets to the planar surface with adhesive to secure them for transport. For example, a power transmission system designed in the form of a universal constant velocity joint is known which has an outer ring connected to a second shaft via a screw connection, an inner ring connected to a first shaft via a splined element, and a cage which accommodates ball bearings. On the end face opposite the second shaft, the joint is terminated with a closing plate, and on the end face opposite the first shaft it is terminated with a boot via an adapter. Each end face of the outer ring is furnished with an annular depression into which a gasket is placed and then centred by the depression. The gaskets are glued to the respective end face of the outer ring 2 (US 2003/0 042 690). The dis-advantage of gluing consist in that it represents an additional work step, which furthermore entails a certain time to allow the adhesive to dry or cure. Only special adhesives with fast-acting bonding properties which also do not attack the gasket material can be considered for use as the adhesive. Accordingly, it may happen that different adhesives have to kept on hand for different gasket materials. The extra work step and the adhesive increase the costs of the joint and the rolling bearing.

An external part 3 of a constant velocity joint with a sealing surface for an annular gasket is also known. This gasket has a sealing profile which is formed by a radially outer, first sealing element and a radially inner, second sealing element. The two sealing elements in the form of O-rings are connected to each other by a connecting bridge and a form-stabilising element. A circumferential hollow is present on both sides of the connecting bridge. In order to secure the radial position of the gasket, the contact surface of the external part or of the cover which seals the external part is furnished with a limiting fin (DE 10 2009 018 373 A1).

Finally, a constant velocity joint with integral internal joint part is also known, consisting of an external joint part with inner bearing races, an internal joint part with outer bearing races assigned to the inner bearing races, and ball bearings accommodated in a ball bearing cage. The external joint part can be connected to a connecting element and sealed on the side facing said connecting element with a closing cover. The internal joint part is embodied as an integral internal joint part which is connected to a shaft part so as to be non-destructively detachable therefrom and is sealed on this side by means of a flexible sealing element facing towards the external joint part (DE 10 2016 007 495 A1).

In view of the above, it is the object of the invention to reduce the labour and cost associated with securing a gasket on the pre-assembled joint or rolling bearings, and thereby ultimately to guarantee the sealing function of the gasket when the joint or rolling bearings are in the operating state.

SUMMARY

The invention is developed on the basis of an external part for homokinetic joints and rolling bearings, wherein the external part (1) has an annular sealing surface (12) on at least one of its end faces, Axially extending drillholes (15) are created on the end face in the external part (1) to accommodate fastening means, wherein the sealing surface (12) extends radially between the drillholes (15) and the inner diameter of the external part (1) in the region of the drillholes (15).

According to the invention, a contour (16) which protrudes from the sealing surface (12) is arranged on the one or more end face sealing surfaces (12) of the external part (1), against which contour a gasket (13) is pressed in the assembled state. This protruding contour (16), with a longitudinal section in the form of a lug, offers a small pressing surface for the gasket (13) even in the pre-assembled state so that its position is secured without use of an adhesive even with small pressing forces such as are normally applied when the component to which the external part (1) belongs is pre-assembled, as well as during transport of the component and subsequent work steps.

DETAILED DESCRIPTION

The advantage of the external part according to the invention with the characterizing features "a contour (16) which protrudes from the sealing surface (12) is arranged on the one or more end face sealing surfaces (12) of the external part (1), against which contour a gasket (13) is pressed in the assembled state" over the related art described earlier is that it guarantees that once set during preassembly the position of the gasket required to ensure reliable sealing function of the gasket in the operating state is maintained even under the loads exerted on the gasket during transport and subsequent work steps without any additional work steps or securing means. This securing means is effected solely with the pressing forces that are normally brought to bear on the gasket during preassembly.

These advantages are realised according to the invention in that a contour which typically protrudes vertically from the sealing surface in the axial direction is arranged on each of the end faces which function as sealing surfaces, against which contour the gasket is already pressed in the assembled state while the external part is in the pre-assembled state. Even in the pre-assembled state, this contour, whose longitudinal section protrudes in the manner of a lug, offers a small pressing surface for the gasket so that its position is secured without use of an adhesive even with small pressing forces such as are normally applied when the component to which the external part belongs is pre-assembled, as well as during transport of the component and subsequent work steps.

The dimensions of the protruding contour, particularly its height, depend on the nature of the gasket, in particular its thickness and the material it is made from.

The contour can be arranged in any regions on the sealing surface, that is to say in the region of either the outer or the inner diameter of the sealing surface or in the region between the inner and outer diameters of the sealing surface. The most effective sealing surface possible in the pre-assembled state is created when it is arranged in the region of the outer diameter.

According to an advantageous variant of the invention, the protruding contour extends without interruption around the circumference, i.e. it forms a closed ring. With regard to manufacturing, this can be created simply, for example by turning, and can also be applied practically for outer rings of rolling bearings. In order to affix the gasket securely, however, it is entirely sufficient to dispose the protruding contour only in the form of segments on preferred regions of the sealing surface of the external part.

This is also advantageous from a manufacturing point of view for external parts of homokinetic swivel joints, for example. With external parts of this kind, a particular feature compared with their use in rolling bearings consists in that the external joint part includes inner ball races which extend axially or at an angle to the swivel axis of the joint for the ball bearings inside the joint that transmit the turning moment from the internal part thereof to the external joint point, or in the opposite direction. The bridges that remain between each of the two inner ball races extend axially as far as the sealing surface of the external joint part, wherein the coaxial inner surface of the bridges is designed as a guide surface for a ball cage to accommodated the ball bearings. The drillholes for fastening the closure cover together with the gasket are arranged on the end face in the region of the bridges and coaxially with the swivel axis of the joint. As a consequence, the sealing surface on the end face extends between the drillholes and is guided radially inwardly in the region of the drillholes, in other words here it extends over the end face surface of the bridges. With an external joint part of such kind, in view of this not perfectly annular geometry of the sealing surface it is appropriate from a manufacturing point of view to construct the contour which protrudes vertically from the sealing surface in the axial direction not continuously but instead to arrange the sealing surface either between the drillholes or in the region of the bridges between the drillholes and the inner circumference of the sealing surface.

According to another advantageous variant of the invention, when viewed in cross section the protruding contour has at least one shell surface which extends conically with respect to the axis of the external part.

According to another advantageous variant of the invention, when the protruding contour is viewed in cross section the transition of at least one of its shell surfaces has the form of a radius towards the sealing surface.

According to an equally advantageous variant of the invention, the protruding contour has a flat bearing surface for the gasket. This serves to prevent the contour from cutting into a gasket which is made from a relatively soft material.

Further advantages and advantageous variants of the invention may be discerned from the following description, claims and drawing.

BRIEF DESCRIPTION OF THE DRAWINGS

Preferred embodiments of the object according to the invention are represented in the drawing which illustrates an example of an external part for a homokinetic joint and which will be explained in greater detail below. In the drawing.

DETAILED DESCRIPTION OF THE PREFERRED EMBODIMENTS

Figure 1:
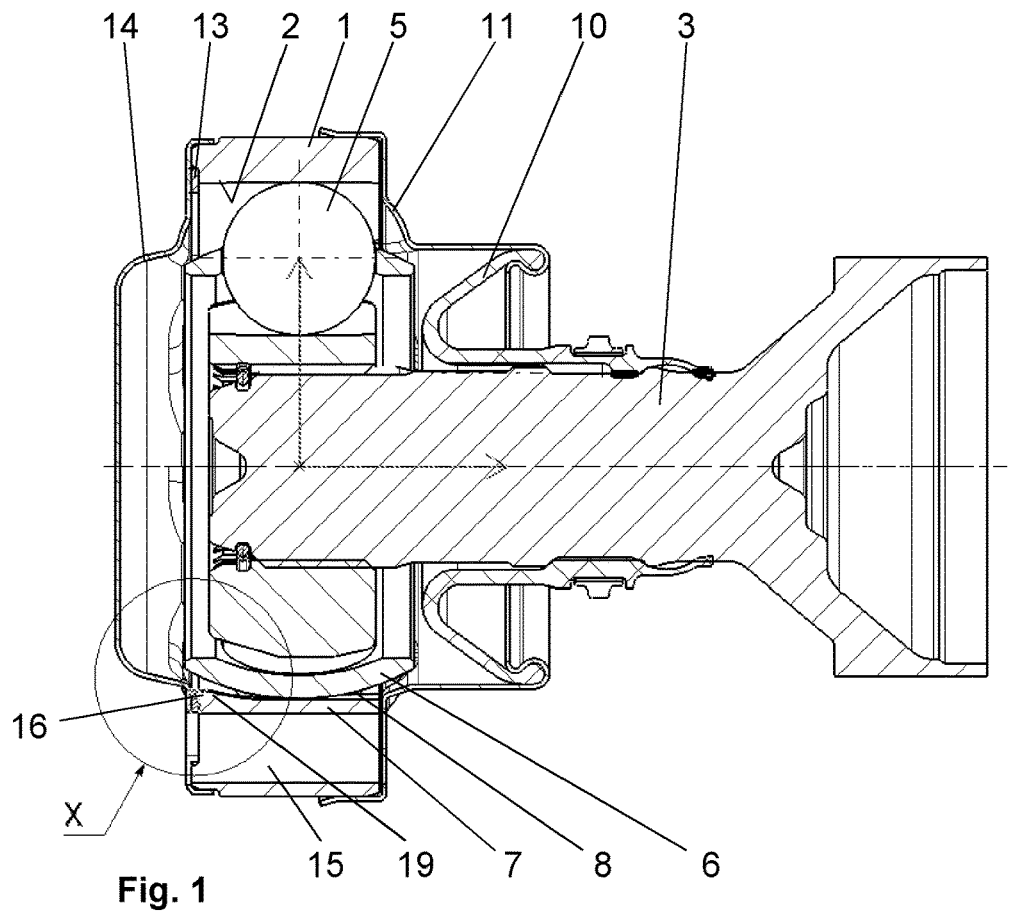
FIG. 1 shows a longitudinal section of a constant velocity joint connected to a shaft journal.

As may be seen in FIG. 1, the constant velocity joint has an external joint part 1 with inner ball races 2 and an internal joint part 3 with outer ball races 4, may be positioned coaxially, displaced and swivelled by means of ball bearings 5 which are arranged between the inner and outer ball races 2 and 4 in the external joint part 1. The ball bearings 5 are accommodated and retained in a cage 6 whose outer circumference bears on the inner circumference of the external joint part 1. This Inner circumference is formed by the inner surfaces of the bridges 7 which remain between the inner ball races 2 and will be referred to in the text below as the cage guide surface 8. A shaft journal 9 is inserted in the internal joint part 3 and is sealed against the external joint part 1 by means of a flexible cuff 10 and a cap 11. On the end face opposite this sealing arrangement, the external joint part 1 has an end face sealing surface 12, via which the constant velocity joint is sealed with a gasket 13 and a cover 14. Cover 14 and gasket 13 are screwed to the housing internal part, and the housing part is furnished with drillholes 15 in the region of the bridges 7 for this purpose.

Figure 2:
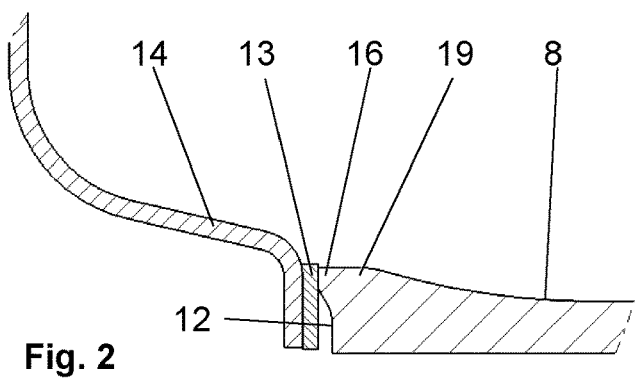
FIG. 2 shows a detail X in the sealing region of the external part of the constant velocity joint with gasket in the pre-assembled state.
Figure 3:
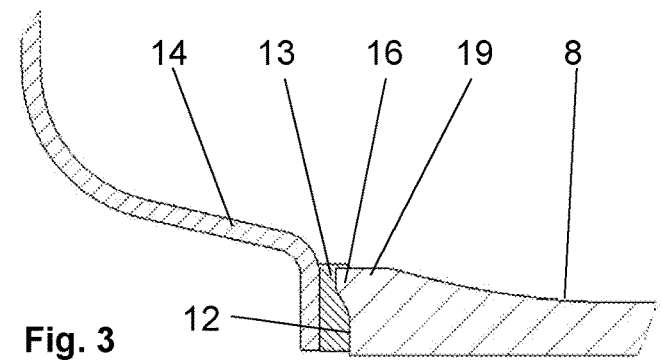
FIG. 3 shows a detail X in the sealing region of the external part of the constant velocity joint with gasket in the finally assembled state
Figure 4:
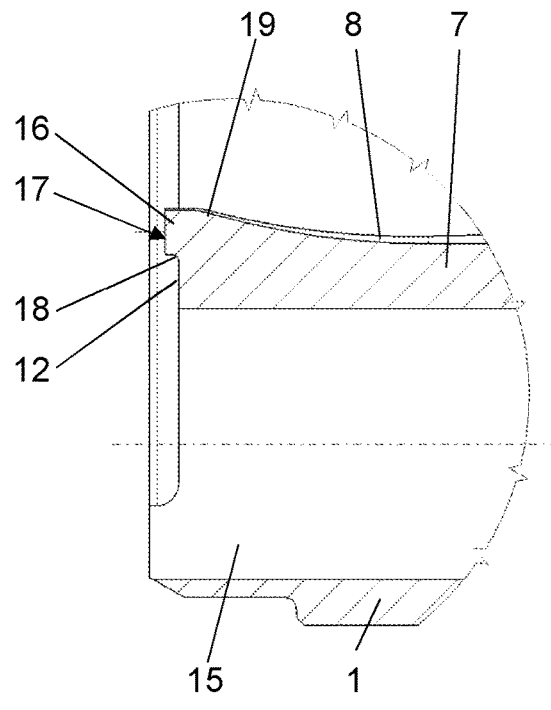
FIG. 4 shows a first variant of the gasket retainer according to the invention.
Figure 5:
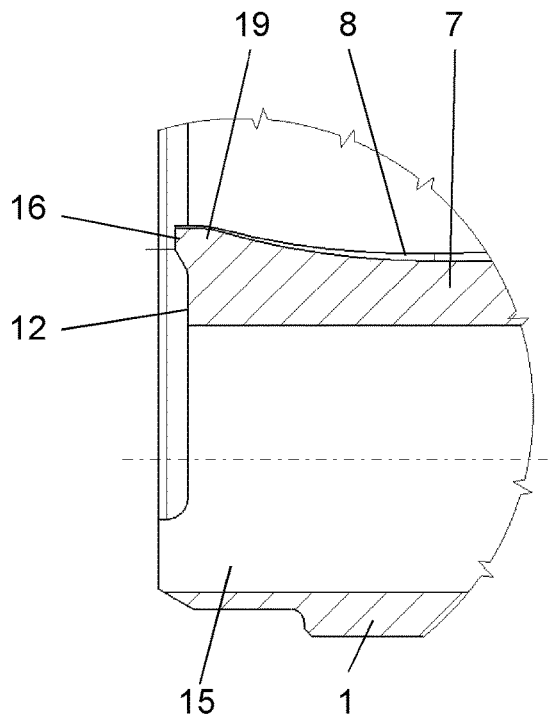
FIG. 5 shows a second variant of the gasket retainer according to the invention.
Figure 6:
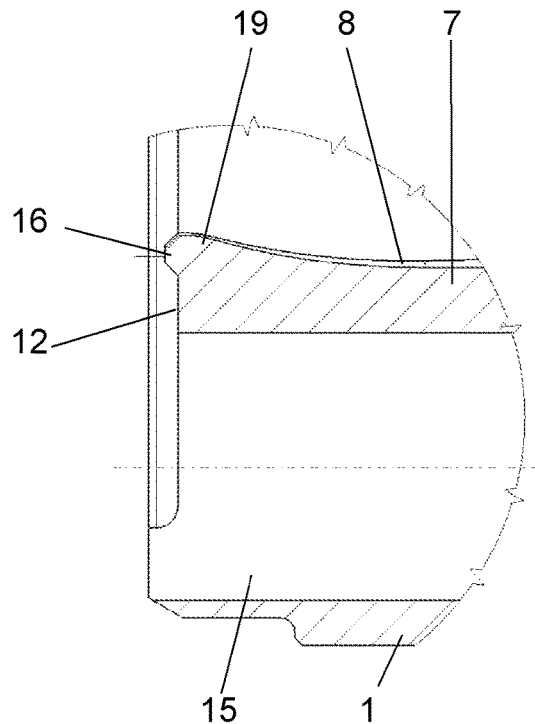
FIG. 6 shows a third variant of the gasket retainer according to the invention and FIG. 7 shows a fourth variant of the gasket retainer according to the invention.

FIGS. 2 and 3 illustrate the bearing of the gasket 13 on the sealing surface 12 of the external joint part 1 as detail X from FIG. 1, wherein FIG. 1 shows a component consisting of external joint part 1, gasket 13, cover 14 and connecting elements—not shown here—in the pre-assembled state, that is to say with a gasket 13 pressed lightly against the external joint part 1 by means of the connecting elements. This figure clearly shows the contour 16 protruding in accordance with the invention a few tenths of a millimetre axially from the sealing surface 12, which contour secures the gasket 13 against the external joint part 1 even under light pressure so that it is held in position even while the component is being transported, during downstream joining operations and when it is subsequently installed in a motor vehicle, without damaging the gasket 13. In this pre-assembled state, the gasket 13 lies flush in line with the axially protruding contour 16. FIG. 3 shows the same component in the finally assembled state, wherein the gasket 13 is now pressed fully against the sealing surface 12 of the external joint part 1, and the axially protruding contour 16 passes into the gasket 13, and the gasket 13 is pressed against the sealing surface 12 of the bridge 7.

Figure 7:
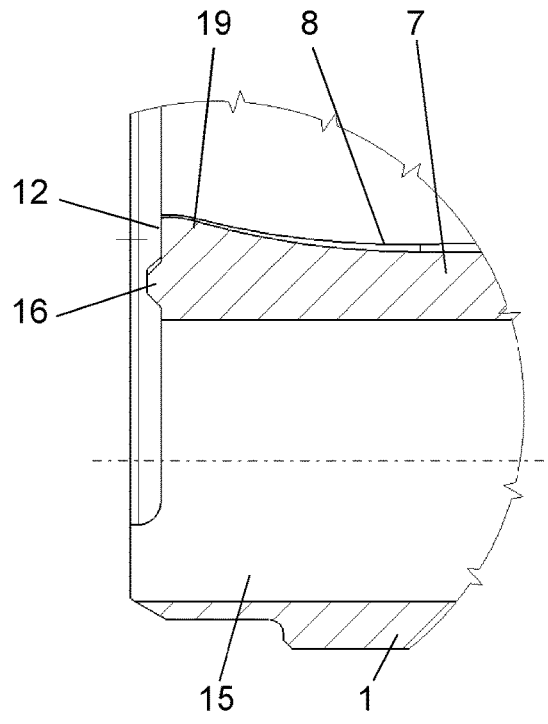

FIGS. 4 to 7 show two different arrangements and three different cross sectional shapes of the radially protruding contour 16. In the variants represented in FIGS. 4 to 6, the radially protruding contour 16 is arranged in the region of the inner diameter of bridges 7 on which the cage guide surface 8 is supported. FIG. 7 shows the arrangement thereof in the middle of the sealing surface 12 of bridges 7. The cross-sectional shape of the contour 16 may be rectangular, trapezoidal on one or both sides. If the cross-sectional shape is rectangular, a broad, flat bearing surface 17 is created (FIG. 4), in which case it is advantageous to provide the one or more shell surface(s) protruding vertically from the sealing surface 12 with a transition radius 18. If the cross-sectional shape is trapezoidal (FIGS. 5, 6 and 7), the protruding contour 16 tapers conically into a transition with the sealing surface 12, so the bearing surface of the gasket 13 is smaller.

The detail drawings in FIGS. 2 to 7 show another special feature of the design of the cage guide surfaces 8 which is independent of the resent invention: The cage guide surfaces 8 have an alignment which is guided radially in the direction of the swivel axis of the external joint part 1 towards the sealing surface 12. Consequently, the radial thickness of the bridges 7 increases or, expressed in a different way, the bridges 7 have a radial overhang 19 which has the effect of radially enlarging the width of the sealing surface 12 on the bridges 7 in the region of the drillholes 15.

All of the features represented here may be essential to the invention either individually or on any combination with each other.

LIST OF REFERENCE NUMERALS

1 External joint part
2 Inner ball race
3 Internal joint part
4 Outer ball race
5 Ball bearing
6 Cage
7 Bridge
8 Cage guide surface
9 Shaft journal
10 Cuff
11 Cap
12 Sealing surface
13 Gasket
14 Cover
15 Drillhole
16 Axially protruding contour
17 Flat bearing surface
18 Transition radius
19 Radial overhang

The invention claimed is:

1. External part for homokinetic joints and rolling bearings, wherein the external part (1) has an annular sealing surface (12) on at least one of its end faces, and axially extending drillholes (15) are created on the end face in the external part (1) to accommodate fastening means, wherein the sealing surface (12) extends radially between the drillholes (15) and the inner diameter of the external part (1) in the region of the drillholes (15),
   characterized in that
   a contour (16) which protrudes from the sealing surface (12) is arranged on the one or more end face sealing surfaces (12) of the external part (1), against which contour a gasket (13) is pressed in the assembled state.

2. External part according to claim 1,
   characterized in that
   the protruding contour (16) extends circumferential without interruption.

3. External part according to claim 1,
   characterized in that
   the protruding contour (16) is arranged in the region of the outer diameter of the sealing surface (12).

4. External part according to claim 1,
   characterized in that
   the protruding contour (16) is arranged in the region of the inner diameter of the sealing surface (12).

5. External part according to claim 1,
   characterized in that
   the protruding contour (16) is arranged in the region between the inner and outer diameters of the sealing surface (12).

6. External part according to claim 1,
   characterized in that
   when viewed in cross section the protruding contour (16) has at least one shell surface extending conically towards the axis of the external part (1).

7. External part according to claim 1,
   characterized in that
   when the protruding contour (16) is viewed in cross section, a transition of at least one shell surface of said protruding contour to the sealing surface (12) is constructed as a radius (18).

8. External part according to claim 1,
   characterized in that
   the protruding contour (16) has a flat bearing surface for the gasket (13).

* * * * *